United States Patent
Harding

(10) Patent No.: US 7,477,725 B2
(45) Date of Patent: Jan. 13, 2009

(54) COMPUTED EXAMINATION OF AN OBJECT BY USING COHERENT-SCATTERED RADIATION

(75) Inventor: Geoffrey Harding, Hamburg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 87 days.

(21) Appl. No.: 10/578,455

(22) PCT Filed: Nov. 2, 2004

(86) PCT No.: PCT/IB2004/052264

§ 371 (c)(1), (2), (4) Date: May 8, 2006

(87) PCT Pub. No.: WO2005/045407

PCT Pub. Date: May 19, 2005

(65) Prior Publication Data

US 2007/0133741 A1 Jun. 14, 2007

(30) Foreign Application Priority Data

Nov. 11, 2003 (EP) .................. 03104152

(51) Int. Cl.
*G01N 23/04* (2006.01)

(52) U.S. Cl. .................. 378/57; 378/146
(58) Field of Classification Search ............ 378/21–27, 378/57, 19, 145–147, 149
See application file for complete search history.

(56) References Cited

U.S. PATENT DOCUMENTS

| | | | |
|---|---|---|---|
| 3,936,638 A * | 2/1976 | Gibbons | 378/5 |
| 4,578,753 A | 3/1986 | Crawford et al. | 378/11 |
| 4,896,342 A | 1/1990 | Harding | 378/87 |
| 5,696,806 A | 12/1997 | Grodzins et al. | 378/86 |
| 2002/0099284 A1 | 7/2002 | Herrmann | 600/407 |
| 2006/0193434 A1* | 8/2006 | Green | 378/57 |

FOREIGN PATENT DOCUMENTS

DE 3712928 A1 8/1988

* cited by examiner

*Primary Examiner*—Courtney Thomas
(74) *Attorney, Agent, or Firm*—Michael E. Belk

(57) ABSTRACT

An examination apparatus, such as for inspection of baggage or any object of interest, has a source of radiation which is moved during scanning of the object of interest. A scattered radiation are detected which is scattered by the object of interest under a particular predetermined scatter angle, without moving the detector array. By detecting the scatter radiation scattered under the predetermined scatter angle, the vertical coordinate of the location of the scatter center in the object of interest and its composition may be derived.

19 Claims, 2 Drawing Sheets

COMPUTED EXAMINATION OF AN OBJECT BY USING COHERENT-SCATTERED RADIATION

The present invention relates to the field of examination of an object by using coherent-scattered radiation. More particularly, the present invention relates to an examination apparatus for examining an object of interest, a method of examining an object of interest with an examination apparatus and a computer program product executed on an examination apparatus for examination of an object of interest.

Known scanners using coherently-scattered x-rays comprise mechanical components which require precision movements. Due to the required precise movement of these mechanical components, these scanners are often very bulky and heavy which makes a transportation of these scanners difficult. Also, due to the precise adjustment of the elements performing these precise movements, a readjustment may be required each time the scanner is moved.

However, there are many situations in which it would be desirable to have a compact device for examining objects of interest. For example, there may be a need for portable baggage scanners for examining objects left in public areas, such as airport terminals, or in places where there is no scanning facility available and where it may be inconvenient or potentially dangerous to transport the suitcase or object of interest to a baggage scanner.

It is an object of the present invention to provide for an examination apparatus such as a scanner which is movable.

According to an exemplary embodiment of the present invention, the above object may be solved with an examination apparatus for examining an object of interest, which comprises a source of radiation for generating a first radiation penetrating the object of interest and a scatter radiation detector for detecting a second radiation of the first radiation, wherein the second radiation is scatter radiation which is scattered from the object of interest. The scatter radiation detector is stationary during scanning of the object of interest and the source of radiation is displaceable during the scanning of the object of interest.

In other words, according to this exemplary embodiment of the present invention, an examination apparatus for examining an object of interest is provided, in which the source of radiation may be the only moving part during scanning. The source of radiation generates a first radiation beam penetrating the object of interest. This first radiation beam is then scattered within the object of interest and the resulting scatter radiation is detected by a scatter radiation detector, which does not move during the scanning of the object of interest.

Advantageously, since the source of radiation may be the only moving part within the examination apparatus, the examination apparatus may be compact and easily transportable. Also, no readjustment of moving parts may be required after the apparatus has been moved.

According to another exemplary embodiment of the present invention, the source of radiation is displaceable along at least a first portion of a first circular path. Advantageously, by moving the source of radiation along a portion of a circular path, a two-dimensional segment of the object of interest may be scanned. Since the source of radiation may only be moved along a portion of the first circular path and not along the whole circular path, the size of the examination apparatus may be reduced.

According to another exemplary embodiment of the present invention, a location of a region within the object of interest from which scatter originates is reflected onto a coordinate of the scatter radiation detector. Advantageously, according to this exemplary embodiment of the present invention, each coordinate of the detection area of the scatter radiation detector corresponds to a respective location of a scatter center within the object of interest. Therefore, by determining the coordinate of the scatter radiation detector on which a scatter radiation has been detected, the location of the scattering center within the object of interest may be derived.

According to another exemplary embodiment of the present invention, the scatter radiation detector is stationary arranged around a rotational axis during scanning of the object of interest and extends along a portion of a second circular path around the rotational axis. Furthermore, the scatted radiation detector comprises at least one detector element, wherein the at least one detector element is arranged along the portion of the second circular path, which corresponds to the first portion of the first circular path. The at least one detector element is an energy-resolving detector element and the coordinate of the scatter radiation detector, on which a height of the region within the object of interest from which scatter originates is coded, is a radial coordinate.

Advantageously, according to this exemplary embodiment of the present invention, the scatter radiation detector may comprise a plurality of detector elements which may be adapted for performing an energy-resolving detection of scattered radiation. Since the detectors elements are arranged along the portion of the second circular path, the vertical coordinate or the height of the region within the object of interest from which scatter originates may be derived from the radial coordinate of a detected scatter event.

According to another exemplary embodiment of the present invention, the examination apparatus further comprises a primary collimator for collimating the first radiation such that the first radiation has a wedge shape and converges at a stationary point of the transmission detector. Furthermore, the examination apparatus comprises a secondary collimator for absorbing radiation propagating in a direction different from the direction defined by a cone semi angle and a scatter angle and comprises a transmission detector for receiving a third radiation attenuated by the object of interest. The transmission detector may be stationary during scanning of the object of interest.

Advantageously, according to this exemplary embodiment of the present invention, no moving parts or alignment mechanisms have to be provided for the transmission detector, since it may be immovably mounted on the examination apparatus and still detect transmitted radiation. By absorbing radiation which does not propagate in a pre-defined direction, the secondary collimator passes only scatter radiation to the scatter radiation detector, which contains height information.

According to another exemplary embodiment of the present invention, the secondary collimator comprises a plurality of channels formed by a radiation-absorbing material, wherein each of the channels of the plurality of channels is oriented with respect to the direction defined by the cone semi angle and the scatter angle.

Advantageously, according to an aspect of this exemplary embodiment of the present invention, the channels may be formed of a material such as steel which strongly absorbs electromagnetic radiation, such as x-rays, not propagating parallel to the channel orientation. A collimator of steel channels or steel lamella provides an efficient means for filtering unwanted radiation.

According to another exemplary embodiment of the present invention, the rotational axis is defined by a center of the first circular path and a center of the second circular path, wherein the rotational axis is perpendicular to a first area encircled by the first circular path and perpendicular to a second area encircled by the second circular path. Furthermore, the transmission detector is stationary arranged on the rotational axis, wherein the stationary point of the transmission detector at which the first radiation converges is located in a detection center of the transmission detector and wherein the third radiation converges at the stationary point while the source of radiation moves along a portion of the first circular path.

Advantageously, according to this exemplary embodiment of the present invention, the first radiation and the third radiation, which results from the first radiation by attenuation of the object of interest, always converge at the stationary point of the transmission detector, independent of the movement of the radiation source.

According to another exemplary embodiment of the present invention, the examination apparatus is transportable and adapted for baggage inspection. Furthermore, the source of radiation is a polychromatic x-ray source. Advantageously, according to this exemplary embodiment of the present invention, objects may be examinable, which cannot be transported to a stationary suitcase or baggage scanner. This may be of particular interest for airport security applications. Furthermore, since no monochromatic radiation is needed for examination of the object of interest, no intensity-reducing monochromators have to be incorporated into the examination apparatus and therefore, a high intensity of radiation is available for inspection. However, this may also be advantageous for other applications, such as medical applications, allowing to bring the scanner to an immovable patient or industrial application.

According to another exemplary embodiment of the present invention, the source of radiation comprises a laser pointer. A laser beam of the laser pointer is aligned with the third radiation such that the laser beam of the laser pointer propagates parallel to the third radiation beam and aims on the stationary point, which facilitates the alignment of the examination apparatus and in particular of the radiation source, since the laser beam may be visible for the human eye.

According to another exemplary embodiment of the present invention, the examination apparatus further comprises a calculation unit for reconstructing an image from readouts of the transmission detector and the scatter radiation detector. Furthermore, the examination apparatus may also be adapted for the detection of explosives, for example for the application as x-ray baggage inspection system at airports, which automatically discriminates explosive materials on the basis of the reconstructed coherent scatter function images based on readouts of the transmission detector and the scatter radiation detector by, for example, comparing reconstructed scatter functions with predetermined tables of characteristic measurements for such explosives.

According to another exemplary embodiment of the present invention, the above object may also be solved with a method of examining an object of interest with an examination apparatus, wherein a source of radiation is energized such that the source of radiation generates a first radiation adapted to penetrate the object of interest. Then, an energy measurement of the second radiation scattered from the object of interest by means of a scatter radiation detector with energy resolving detector elements is performed, wherein the scatter radiation detector is stationary during the scanning of the object of interest. During the scanning of the object of interest, the source of radiation may be displaced.

Advantageously, according to this exemplary embodiment of the present invention, a method may be provided which allows for a fast and easily applicable material discrimination of the object of interest. Also, the method may provide for a location and orientation independent examination of a patient in medical applications or industrial applications.

According to another exemplary embodiment of the present invention, the source of radiation is displaced along at least a first portion of a first circular path. Advantageously, moving the source of radiation along a path which is circular provides for an easy alignment of the first radiation beam.

According to another exemplary embodiment of the present invention, a location of a region within the object of interest from which scatter originates is coded on a coordinate of the scatter radiation detector. Therefore, according to this exemplary embodiment, by reading out the scatter radiation detector, the position of the scattering center may be derived directly.

According to another exemplary embodiment of the present invention, a rotational axis is defined by a center of the first circular path and a center of the second circular path. Advantageously, first and second circular paths define a first and a second area, respectively, which are parallel to each other and perpendicularly intersected by the rotational axis. The scatter radiation detector is arranged at least at a second portion of the second circular path.

According to another exemplary embodiment of the present invention, an apparatus, which comprises the source of radiation and the scatter radiation detector, is moved to a location of the object of interest and after that, the object of interest is examined. Advantageously, according to this exemplary embodiment of the present invention, the object of interest does not have to be moved in order to be examined. This may be of particular interest in case the object, of interest is a piece of suspicious luggage which may contain explosives.

According to another exemplary embodiment of the present invention, a laser pointer is activated, wherein a laser beam of the laser pointer is aligned with the third radiation. After that, the laser beam is aimed at the scatter radiation detector in order to align the radiation source for scanning.

Advantageously, since the laser beam may be visible for the human eye, alignment of the whole system is facilitated without the use of a detector.

Another exemplar embodiment relates to a computer program product stored on a computer-readable medium which executes the steps of the method according to the present invention when executed on an examination apparatus. Advantageously, this computer program allows for a reduction of computation power in the examination apparatus.

It may be seen as the gist of an exemplary embodiment of the present invention that an examination of an object of interest is provided by moving a source of radiation during scanning of the object of interest and detecting a transmitted beam of radiation, which is generated by the source of radiation and attenuated by the object of interest, and a scattered radiation, which is scattered by the object of interest under a particular scatter angle. Advantageously, by detecting the scatter radiation scattered under the particular scatter angle, the vertical coordinate of the location of the scatter center in the object of interest and it's composition may be derived.

These and other aspects of the present invention will become apparent from and elucidated with reference to the embodiments described hereinafter.

Exemplary embodiments of the present invention will be described below with reference to the following drawings.

Figure 1:
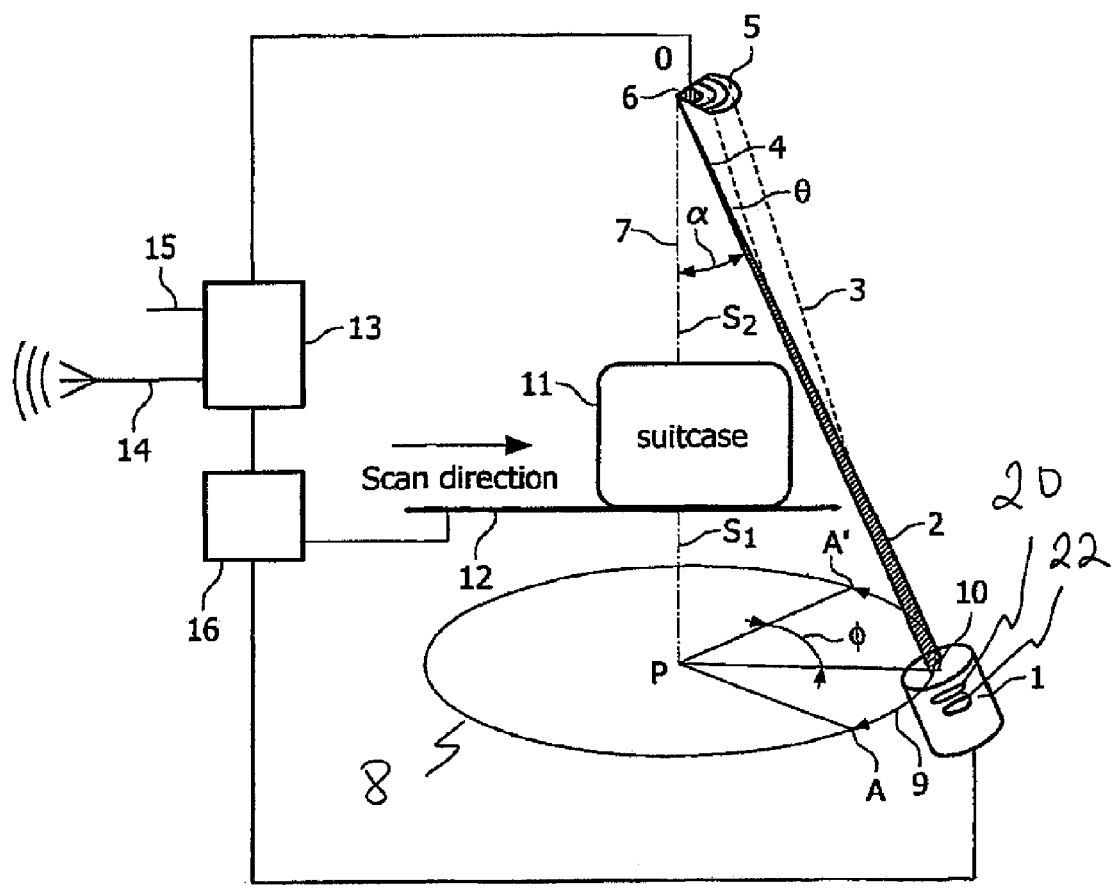
FIG. 1 shows a schematic representation of an exemplary embodiment of an examination apparatus according to the present invention.

The examination apparatus according to an exemplary embodiment of the present invention as depicted in FIG. 1 shows a source of radiation 1, which may be a polychromatic x-ray source 1. The x-ray source 1 is mounted on a segment of a circular track such that it is movable between the points A and A' on an arc having the vertical axis PO. The x-ray source 1, has a linear focus of dimensions about 0.5 mm×50 mm tangentially to the direction of movement. The x-ray source 1 is provided with a primary collimator or first collimator 20, so that the primary x-ray beam or first radiation beam 2 has a wedge shape and converges at the detector plane of the transmission detector 6 on the point O. The primary collimator or first collimator 20 may be designed based on the "Soller sits"°principle and comprises an array of e.g. steel lamella directed to O.

Independent of the angular position $\phi$ of the x-ray source 1 on the circular track 8, the x-ray source is arranged such that the first radiation beam 2 passes through the point O. Due to this, and since the x-ray source 1 moves along a portion 9 of the circular track 8, the first radiation beam 2 travels along a surface of a cone of semi-opening angle $\alpha$. In order to facilitate alignment of the system, the x-ray tube housing (not shown in FIG. 1) may be provided with a laser pointer 10. Advantageously, it may be ensured before scanning that the laser beam always passes through O as the x-ray tube is moved along the circular track.

A suitcase 11 is gradually moved in the direction of the arrow depicted in FIG. 1 while the x-ray source tracks in azimuthal angle $\phi$ repeatedly between the locations A and A'. X-rays scattered from the suitcase at an angle of $\theta$° relative to the first radiation beam are permitted by the second collimator 22 to reach a scatter radiation detector 5. The lowest and highest scatter centers which may be detected by an examination apparatus such as depicted in FIG. 1 are S1 and S2, respectively, which are determined by the dimensions of the detectors 5, 6. The height of the region within the suitcase from which scatter originates is coded onto the radial coordinate of the scatter radiation detector 5 as indicated in FIG. 1. A position of the x-ray 1 source determines a horizontal position of a scatter voxel, i.e. of an information element derived from the detectors 5 and 6, which includes a measured intensity and location component. The examination apparatus depicted in FIG. 1 thus permits x-rays at constant angle of scatter to be recorded in the detector while preserving a unique coding between the position in 3-D of the scatter voxel and the positions of the x-ray source, a conveyor belt on which the suitcase is transported and the radial coordinate of the detector array 5.

The scatter radiation detector may be composed of several, e.g. 12, radial segments together with the transmission detector 6. The whole array of scatter radiation detectors 5 and transmission detector 6 is arranged on a rotational axis 7 and does not move during scanning of the object of interest. The detector array of scatter radiation detectors 5 and transmission detectors may have the shape of a segment of a circle, which corresponds to the first portion of the first circular path AA', as may be taken from FIG. 1. However, other forms may be possible such as a square shaped detector including detectors 5 and 6. The form, size and location of the detectors 5 and 6 of the scanner are selected in accordance with the path of the source of radiation during the scanning. Also the desired maximum scatter angle may be used for designing form, shape, location, dimensions and arrangement of the detectors 5 and 6. For circular source path, circular detectors 5 and 6 may be advantageous. For elliptical source path, elliptical detectors 5 and 6 may be advantageous. For linear source paths or source paths which are composed by linear segments, correspondingly arranged rectangular detectors 5 and 6 may be used.

Typical detector materials include the semi-conductors Ge, CdTe and CdZnTe. The detector array permits energy-resolution (photon spectroscopy) and outputs signals of the energy spectrum of x-rays falling on each segment in a way which is well-known in the art and is therefore herein not described in greater detail. The resulting spectra may then be analyzed with standard software algorithms, as described in e.g. G. Harding and B. Schreiber "Coherent X-ray scatter imaging and its application in biomedical science and industry", Radiation Physics and Chemistry 56, (1999) 229-245, which is hereby incorporated by reference, to identify the material composition of the object of interest.

It should be noted that during scanning the whole detector array 5, 6 is stationary and the only moving part of the examination apparatus is the x-ray source 1, The stationary point O of the transmission detector 6 at which the first radiation 2 converges is located in a detection center of the transmission detector 6. When the first radiation 2 penetrates the object of interest, it is attenuated by the object of interest, resulting in a third radiation 4. But since attenuation of the first radiation does not lead to a remarkable deflection of the radiation beam, the attenuated third radiation 4 still converges at the stationary point O, while the source of radiation 1 is moving along a portion 9 of the first circular path 8. The read outs of the attenuation detector 6 may be used for absorption correction as e.g. described in van Stevendaal et al: "A reconstruction algorithm for coherent scatter computed tomography based on filtered back-projection", Med. Phys. 30(9), September 2003, which is hereby incorporated by reference.

The second collimator comprises a plurality of parallel channels oriented at the angle $\alpha$-$\theta$ relative to the vertical axis PO, which are spaced corresponding to the spacing between adjacent detectors 5 of the detector array 5, 6. These channels may be formed from a material such as steel, which strongly absorbs x-rays not traveling parallel to the channel orientation. To ensure that the scatter radiation falls on the detector array at constant angle $\theta$, irrespective of the azimuthal angle $\phi$, radial collimator of steel lamella may be incorporated into the second collimator.

If necessary, electromechanical actuators (not shown in FIG. 1) may be employed automatically to align the first or second collimators and the scatter radiation detector 5 or the transmission detector 6 before a scan is performed.

Since the x-ray source is the only moving part (apart from a possible conveyor belt 12 and the electromechanical actuators), the arrangement is compact and easily transported. It should be noted that the whole examination apparatus shown in FIG. 1 may be mounted on and transported with a vehicle such as a fork-lift truck or else.

The detector array 5, 6 is connected to a calculation unit 13. The calculation unit 13 receives the detection results from the detector array 5, 6 and determines a scanning result on the basis of the detection results from the detector array 5, 6. In addition, the calculation unit 13 communicates with a motor control unit 16 in order to coordinate the movement of the x-ray source 1 and the conveyor belt 12. Furthermore, a loudspeaker 14 connected to the calculation unit 13 may be provided for issuing an alarm in case the calculation unit 13 determines that there is a dangerous material within the item of interest 11 or a material which cannot be determined. A signal port 15 may transmit the alarm signal to a subsequent detection level. As may be seen from FIG. 1, the examination apparatus is simpler than alternative arrangements owing to the avoidance of precision movements, since a scatter collimator and detectors 5, 6 are stationary during baggage scanning. Furthermore, the examination apparatus may be very compact and easily transportable. It may thus be well suited to the mobile inspection of suspicious objects. The examination apparatus according to an exemplary embodiment of the present invention fulfills a need which has not yet been met in state of the art coherent-scattered x-ray devices, i.e. bringing the baggage scanner to the suitcase in situations where it is not convenient or possible to bring the suitcase to the scanner. Furthermore, the examination apparatus may be employed for the resolution of alarms issued by spatially-distributed baggage inspection systems. Apart from the application in the field of baggage scanning, the scanning may also be applied in medical applications, such as medical imaging or tumor localization or industrial applications such as material testing.

Figure 2:
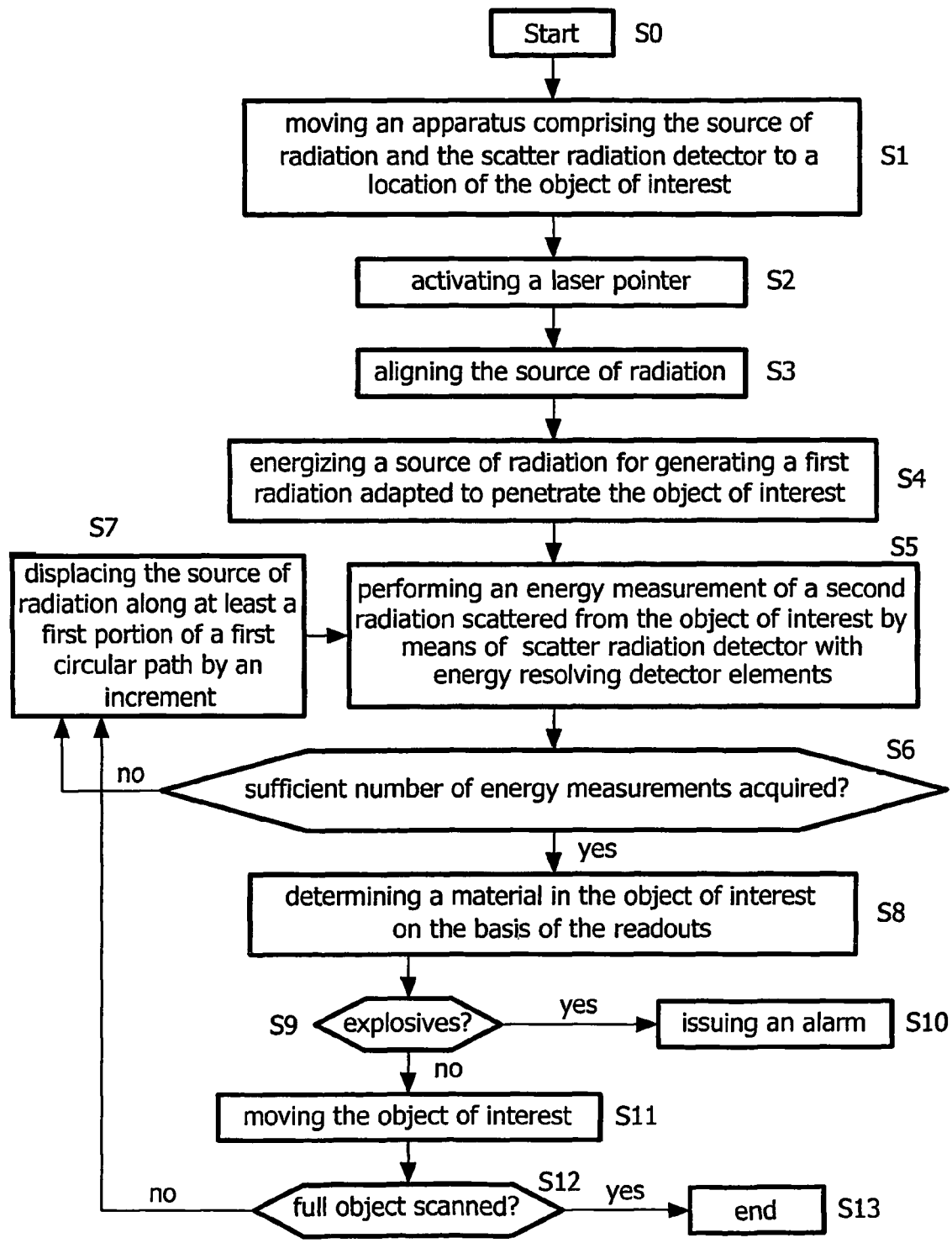
FIG. 2 shows a flow-chart of an exemplary embodiment of a method of operating the examination apparatus of FIG. 1 for examining an object of interest according to the present invention.

FIG. 2 shows a flow-chart of an exemplary embodiment of a method of operating an examination apparatus of FIG. 1.

After the start in step S0, the examination apparatus comprising the source of radiation and the scatter radiation detector is moved to a location of the object of interest, such as an item of baggage 11 in step S1. After that, in step S2 a laser pointer is activated and the laser beam of the laser point, which is aligned with the third radiation, is aimed at the stationary point for facilitating alignment of the examination apparatus. In the next step, S4, a source of radiation is energized in order to generate a first radiation adapted to penetrate the object of interest. Then, in step S5, an energy measurement of a second radiation scattered from the object of interest is performed by means of a scatter radiation detector with energy-resolving detector elements. Then, in step S6, the question is asked whether a sufficient number of energy measurements has been acquired or not. If the answer to this question is no, the source of radiation is displaced along at least a first portion of a first-circular path by an increment in step S7. This may be repeated. If the answer to this question is yes, in step S8, a material in the object of interest is determined on the basis of the readouts and after that a determination is performed, whether the material in the object of interest is an explosive or not. This is done in step S11. If this question is answered with yes, an alarm is issued in step S10. If the question is answered with no, the object of interest is moved. If the full object is scanned (S12), the method continues to step S13, where it ends.

If the object has not been scanned fully yet, the method is repeated from step S7.

Alternatively, or in addition to step 10, e.g. an image may be reconstructed from the readouts of the detectors. The image may be displayed on a display.

Advantageously, the method described with reference to FIG. 2, according to an exemplary embodiment of the present invention, is highly time-efficient, since the measurement of the transmitted beam and the energy-resolved scatter projections are performed at the same time. Also, as mentioned in Step S1 according to this method, the scanning may be performed at the location of the object of interest. Furthermore, by alignment of the source by means of the laser pointer, a simple and precise alignment may be realized without requiring a specially trained operation or service engineer.

The invention claimed is:

1. An examination apparatus for examining an object of interest, the examination apparatus comprising:

a source of radiation for generating a first radiation penetrating the object of interest;
a radiation detector for detecting radiation form at least one of the source and scattered radiation scattered from the object of interest at a scatter angle;
a primary collimator for collimating the first radiation such that the first radiation has a wedge shape and converges at a stationary point of the detector; and
a secondary collimator for absorbing further radiation which is propagating in a direction different from a direction defined by a cone semi angle and the scatter angle;
wherein the detector is stationary during scanning of the object of interest; and wherein the source of radiation is displaceable along at least a portion of a circular path during the scanning of the object of interest so that the first radiation travels along a surface of the cone of semi angle.

2. The examination apparatus of claim 1, wherein a location of a region within the object of interest from which scatter originates is coded on a coordinate of the detector.

3. The examination apparatus of claim 1, wherein the detector is arranged centrally to a rotational axis during scanning of the object of interest and extends along a portion of a further path around the rotational axis; wherein the detector comprises at least one detector element; wherein the at least one detector element is arranged along the portion of the further path; wherein the portion of the further path corresponds to the path of the source of radiation; wherein the at least one detector element is an energy-resolving detector element; and wherein coordinate of the detector on which a height of a region within the object of interest from which scatter originates is coded is a radial coordinate.

4. The examination apparatus of claim 1, further comprising a transmission detector for receiving an attenuated radiation attenuated by the object of interest; wherein the transmission detector is stationary during scanning of the object of interest.

5. The examination apparatus of claim 4, wherein the secondary collimator comprises a plurality of channels formed by a radiation absorbing material; and wherein each of the channels of the plurality of channels is oriented with respect to the direction defined by the cone semi angle and the scatter angle.

6. The examination apparatus of claim 3, wherein the rotational axis is defined by a center of the path and a center of the further path; wherein the rotational axis is perpendicular to a first area encircled by the path and perpendicular to a second area encircled by the further path; wherein the transmission detector is stationary arranged on the rotational axis; wherein the stationary point of the transmission detector at which the radiation converges is located in a detection center of the transmission detector; and wherein a third radiation attenuated by the object of interest is converging at the stationary point while the source of radiation is moving along a portion of the path.

7. The examination apparatus of claim 1, wherein the examination apparatus is transportable and adapted for baggage inspection; and wherein the source of radiation is a polychromatic x-ray source.

8. The examination apparatus of claim 1, wherein the source of radiation comprises a laser pointer configured to provide an alignment beam to facilitates alignment of the source of radiation toward a desired direction.

9. The examination apparatus of claim 1, further comprising a calculation unit for reconstructing an image from readouts of the detector; wherein the examination apparatus is adapted for detection of explosives in the object of interest by using readouts from the detector.

10. The examination apparatus of claim 1, further comprising a platform configured to move the object of interest, and a calculation unit configured to coordinate movement of the source of radiation and the platform and to construct an image from outputs of the scatter radiation detector.

11. The examination apparatus of claim 1, wherein the radiation detector has a shape that matches the path of the source of radiation.

12. A method of examining an object of interest with an examination apparatus, the method comprising the acts of:
   energizing a source of radiation such that the source of radiation generates a first radiation adapted to penetrate the object of interest;
   performing an energy measurement of a second radiation scattered from the object of interest at a scatter angle by means of a scatter radiation detector with energy resolving detector elements; wherein the scatter radiation detector is stationary during the scanning of the object of interest;
   displacing the source of radiation during a scanning of the object of interest along at least a portion of a circular path so that the first radiation travels along a surface of a cone of semi angle;
   collimating by a primary collimator the first radiation such that the first radiation has a wedge shape and converges at a stationary point of the detector; and
   absorbing by a secondary collimator further radiation which is propagating in a direction different from a direction defined by the cone semi angle and a scatter angle.

13. The method of claim 12, further comprising the act of coding a location of a region within the object of interest from which scatter originates on a coordinate of the scatter radiation detector.

14. The method of claim 12, further comprising the act of defining a rotational axis by a center of the first circular path and a center of a second circular path, wherein the scatter radiation detector extends along the second circular path; wherein the rotational axis is perpendicular to a first area encircled by the first circular path and to a second area encircled by the second circular path; wherein the scatter radiation detector is arranged at least at a second portion of the second circular path.

15. The method of claim 12, further comprising the acts of:
   moving an apparatus comprising the source of radiation and the scatter radiation detector to a location of the object of interest; and
   examining the object of interest.

16. The method of claim 12, further comprising the acts of:
   activating a laser pointer; wherein a laser beam of the laser pointer is aligned with the first radiation; and
   aiming at the scatter radiation detector for aligning scanning.

17. The method of claim 12, further comprising the acts of:
   moving the object of interest; and
   coordinating the displacing act with the moving act to construct an image from the energy measurement.

18. Computer program product stored on a computer readable medium, wherein, when the computer program product is executed on an examination apparatus for examination of an object of interest, the examination apparatus performs the following operation:
   energizing a source of radiation such that the source of radiation generates a first radiation adapted to penetrate the object of interest;
   displacing the source of radiation along at least a portion of a circular path during a scanning of the object of interest so that the first radiation travels along a surface of the cone of semi angle;
   performing an energy measurement of a second radiation scattered from the object of interest at a scatter angle by means of a scatter radiation detector;
   collimating by a primary collimator the first radiation such that the first radiation has a wedge shape and converges at a stationary point of the detector; and
   absorbing by a secondary collimator further radiation which is propagating in a direction different from a direction defined by the cone semi angle and the scatter angle; wherein the scatter radiation detector is stationary during the scanning of the object of interest.

19. The computer program product of claim 18, executed on the examination apparatus, the examination apparatus further performing the acts of:
   moving the object of interest; and
   coordinating the displacing act with the moving act to construct an image from the energy measurement.

* * * * *